No. 686,463. Patented Nov. 12, 1901.
G. S. LEE.
VEHICLE WHEEL.
(Application filed Aug. 1, 1901.)
(No Model.) 3 Sheets—Sheet I.

WITNESSES: INVENTOR
George S. Lee
BY
Chapin & Hayford
his ATTORNEYS

No. 686,463. Patented Nov. 12, 1901.
G. S. LEE.
VEHICLE WHEEL.
(Application filed Aug. 1, 1901.)
(No Model.) 3 Sheets—Sheet 2.

WITNESSES: INVENTOR
Harry Goss. George S. Lee
J. Wares Bryce BY
Chapin & Hayward
his ATTORNEYS No. 686,463.
Patented Nov. 12, 1901.
G. S. LEE.
VEHICLE WHEEL.
(Application filed Aug. 1, 1901.)
(No Model.)
3 Sheets—Sheet 3.
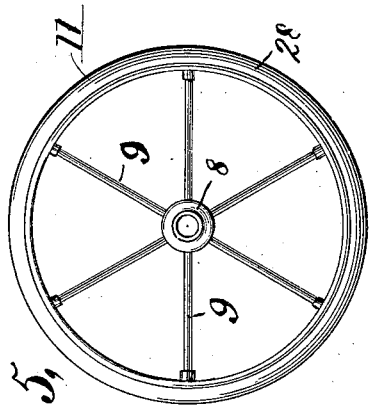
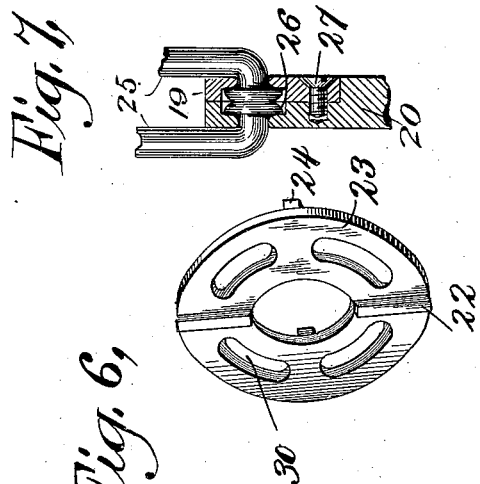
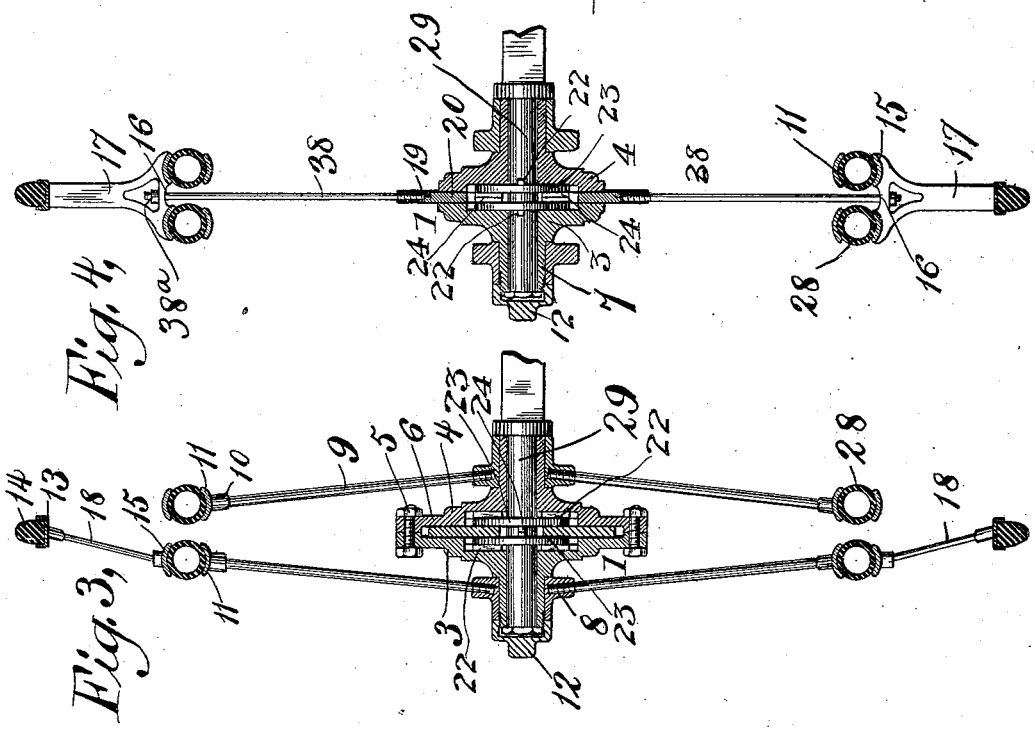
WITNESSES:
Harry Goss.
J. Waus Bryce
INVENTOR
George S. Lee
BY
Chapin & Hayward
his ATTORNEYS

UNITED STATES PATENT OFFICE.

GEORGE S. LEE, OF HAWTHORNE, NEW JERSEY.

VEHICLE-WHEEL.

SPECIFICATION forming part of Letters Patent No. 686,463, dated November 12, 1901.

Application filed August 1, 1901. Serial No. 70,454. (No model.)

*To all whom it may concern:*

Be it known that I, GEORGE S. LEE, a citizen of the United States of America, and a resident of Hawthorne, county of Passaic, and State of New Jersey, have invented certain new and useful Improvements in Vehicle-Wheels, of which the following is a specification.

My invention relates to vehicle-wheels; and it is designed as an improvement on the vehicle-wheel shown, described, and claimed in United States Letters Patent No. 672,908, granted April 30, 1901.

The object of the present invention is to simplify and improve the construction and arrangement of parts in the type of wheel therein set forth.

I will describe a vehicle-wheel embodying my invention and then point out the novel features thereof in claims.

Figure 1:
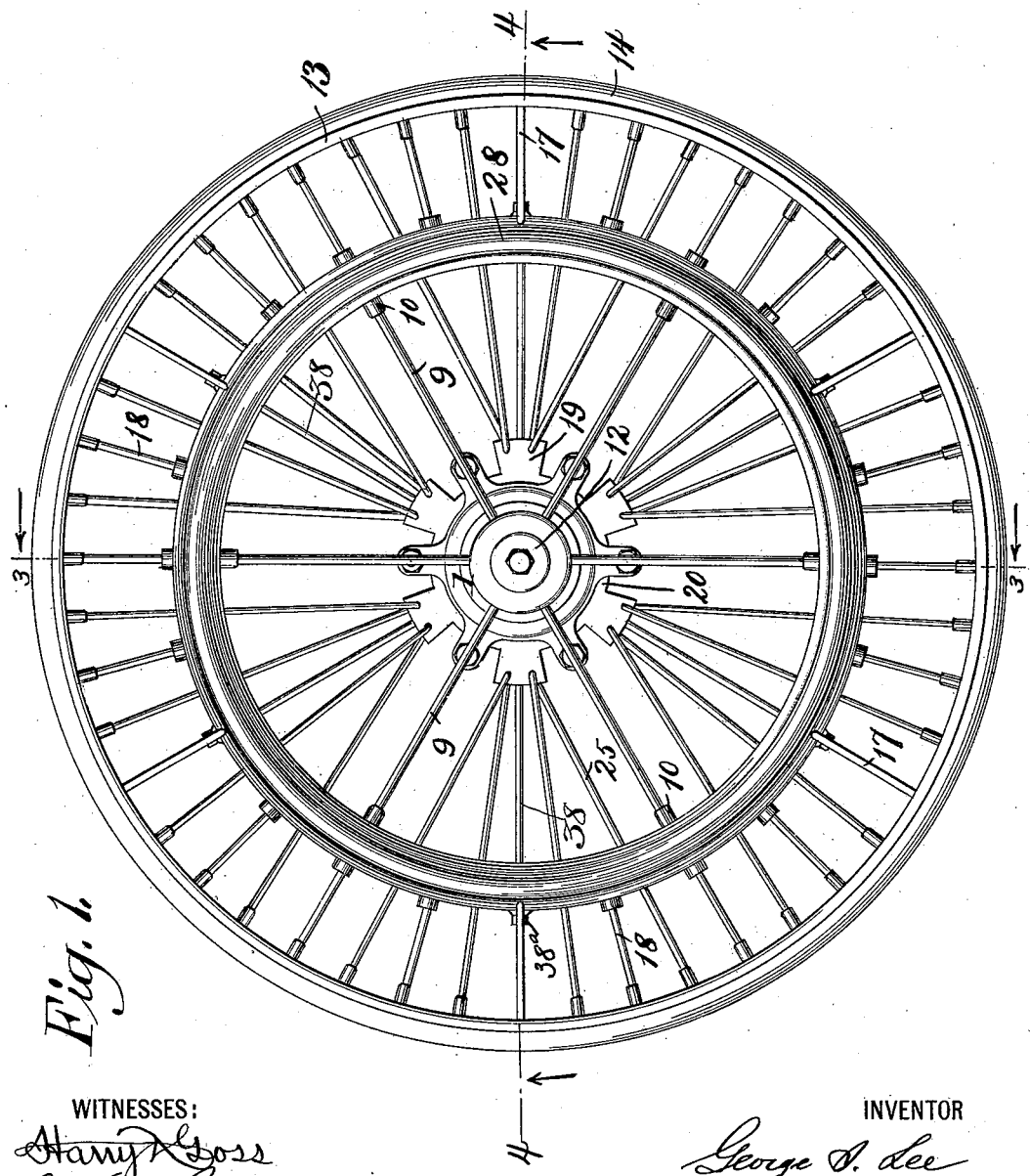
Figure 8:
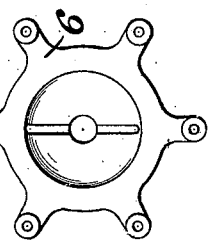
Figure 2:
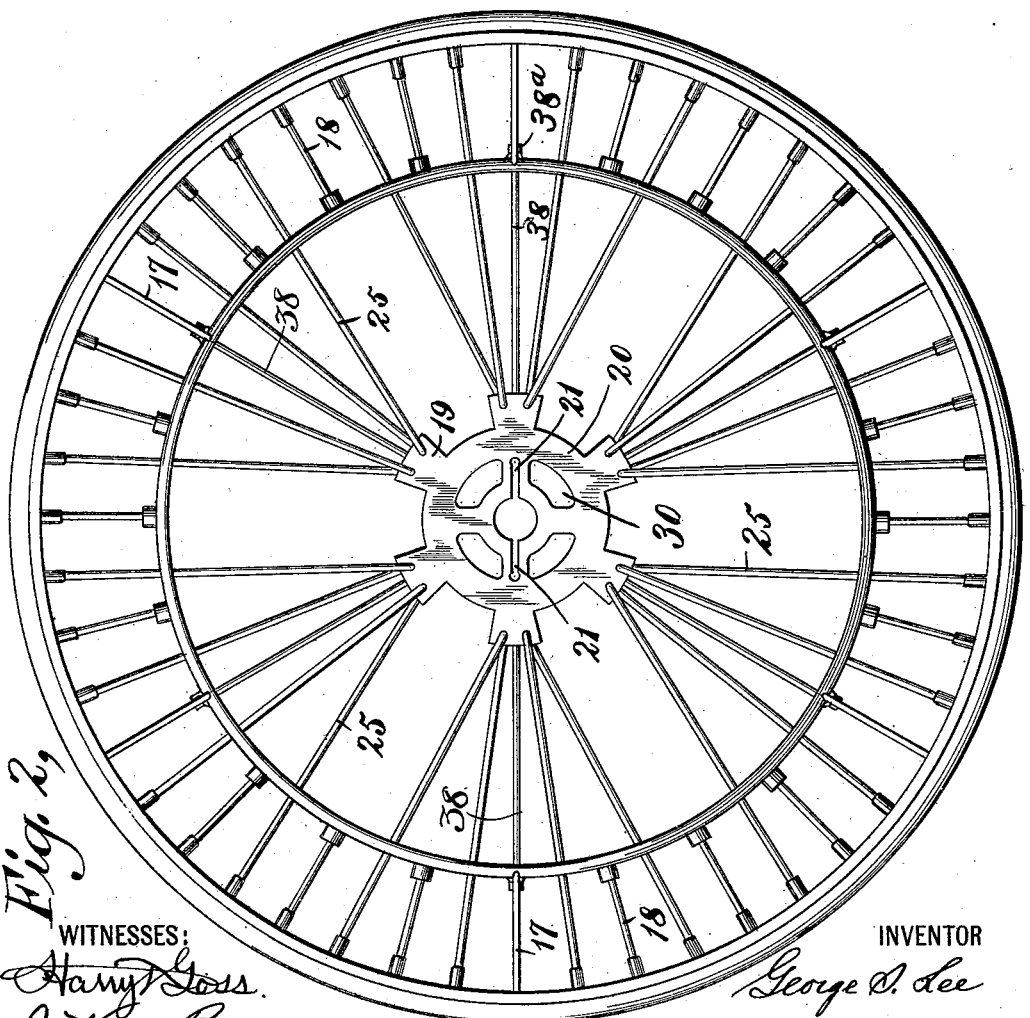

In the accompanying drawings, Figure 1 is a side elevation of a vehicle-wheel embodying my invention. Fig. 2 is a side elevation of one-half of the wheel shown in Fig. 1 with the hub member removed. Fig. 3 is a central transverse sectional elevation through the wheel, the plane of section being upon the line 3 3 of Fig. 1. Fig. 4 is a similar transverse sectional elevation, the plane of section being upon the line 4 4 of Fig. 1. Fig. 5 is a detail elevational view of a part of the hub member. Fig. 6 is a detail perspective view of a guide-plate. Fig. 7 is a detail sectional view. Fig. 8 is a detail elevational view of another part of the hub member.

Similar numerals of reference designate corresponding parts in all of the figures of the drawings.

As in the patent referred to, my improved wheel comprises two members—one carrying the hub portion and which for convenience in the description and claims I will designate as the "hub" member, and the other carrying the outer rim or tire and which for purposes of this specification I will term the "tire" member.

The hub member comprises the hub proper, designated by the reference character 1, and a rim supported from the hub.

The hub consists of the two sections 3 and 4, connected together by means of bolts 5, which pass through radial arms 6. The hub- sections 3 and 4 are to all intents and purposes cup-shaped in order to inclose certain parts, and they are spaced apart by having the ends of the radial arms 6 thickened. (See Fig. 3.) Fitted over the sleeve of each section is a collar 8, having screwed into it the ends of a number of spokes 9, the outer ends of which are held in thimbles 10, carried by a rim 11. The collars 8, spokes 9, and rims 11 comprise a separable part of the hub member, one of such parts being illustrated separately in Fig. 5. One of the collars 8 is held on its sleeve 7 by means of a dust-cap 12, and the other by a shouldered portion of the axle 29, as shown.

The tire member comprises an outer rim or tire 13, which may or may not have a rubber or similar tire 14 secured thereon, and a pair of rims 15, of smaller diameter, which are here shown as being connected with each other by web 16 and to the outer rim 13 by a number of (here shown as being six) strut or brace pieces 17. Intermediate of the rims 13 and 15 are a number of spokes 18, the spokes being secured to the two rims in any well-known manner which will permit of the spokes being tightened or loosened to tune up the wheel.

Extending inwardly from the web 16 toward the hub are a number of spokes 38, the ends of which are screwed into radial projections 19 of a floating plate or ring 20. This floating plate or ring in this case becomes a part of the tire member and is intermediate of the hub-sections. The spokes 38 are adjusted by means of nuts 38ª.

The plate 20 (see Fig. 2) is provided on each side with a pair of grooves 21, which receive tongues 22, provided on guide-plates 23, arranged within the hub and on each side of the said plate 20. On the opposite side of each of the guide-plates 23 are other tongues 24, arranged at right angles to the tongues 22, which tongues 24 fit in grooves 21, provided for them in the hub-sections 3 and 4. Connected also with the plate 20 and the rim 13 are spokes 25. The ends of the spokes 25 where they fit in the radial projections 19 of the plate 20 are each provided with a head 26, and the other ends of the same spokes are screw-threaded and fit into internally-screw-threaded thimbles carried by the rim 13, which permit of the spokes being tightened or loosened in tuning up the wheel. As will be seen by reference to Fig. 7, the ends of the spokes 25 are bent over and provided with heads. The spokes pass through openings provided for them in the projections 19, and the heads thereof fit into recesses. Four spokes are here shown as being provided for each projection 19, and these spokes 25 are arranged in pairs, the spokes of each pair having their heads abutting. To assist in threading the spokes in the projections, each projection is provided with a removable part 26, which is secured by means of screws 27.

For convenience in assembling the parts the radial projections of the floating plate alternate with the radial arms of the hub-sections. The peripheral portions of the floating plate intermediate its radial projections are normally flush with the peripheral portions of the hub-sections intermediate its radial arms. This arrangement permits of a dust-proof joint being formed between these parts. Any dust that may get in will work out in the relative movements of these parts.

The guide-plates 23 in their connection with the floating plate 20 and the hub-sections 3 and 4, as described, will permit a relative movement between the floating plate and the hub 1, and hence between the tire member and the hub member, in right lines in the plane of rotation of the wheels, but will positively lock the parts against relative rotation. Movement backward and forward in any right line in the same plane with these two movements will be permitted by a compound movement of the said floating and guide plates.

The cushioning devices herein employed comprise two hollow flexible inflatable tubes 28. These tubes may be inserted in a deflated condition when between the rims 11 and 15 and may be inflated when in position in a manner well known.

29 designates a vehicle-axle which may or may not be used in connection with ball-bearings. I preferably provide cut-out portions or recesses 30 in the guide-plates and floating plates and insert in such cut-out portions a solid lubricant.

The operation of the wheel will be readily understood, it being the same as that set forth in the patent referred to.

I wish it to be understood that I do not desire to limit myself only to the precise details of construction and combination of parts as herein shown and described, as the same may obviously be varied within wide limits without departing from the spirit and scope of my invention.

What I claim is—

1. In a wheel, the combination of a hub, collars carried by said hub but separable therefrom, spokes and rim carried by each of said collars, an outer rim, cushioning means intermediate of said outer rim and said two inner rims, a floating plate in said hub, spokes connected with said plate and outer rim, and means intermediate said plate and hub for permitting relative movement between them in the plane of rotation of the wheel, but for locking the said members against relative rotary movement.

2. A guide-plate for a vehicle-wheel of the type described, comprising an annular disk having projecting tongues thereon, arranged at right angles to each other upon opposite sides thereof.

3. The combination, in a wheel, of a hub made in sections, a pair of rims supported from said hub, an outer rim, two inner rims connected with said outer rim, a web for connecting the said inner rims together, cushioning devices between said inner rims and the two rims carried by the hub, a floating plate and means provided between the hub-sections for permitting relative movements in the plane of rotation of the wheel between the plate and the hub, spokes connecting said web with the floating plate, and other spokes connecting the floating plate with the outer rim.

4. The combination in a wheel of a sectional hub connected together and spaced apart by radial arms and bolts, rims carried by said hub, a floating plate located between the hub-section and provided with radial portions which alternate with the radial arms of the hub-sections, means provided for permitting a relative movement between the plate and hub-sections in the plane of rotation of the wheel, a tire-rim carrying inner rims, cushioning devices between the said inner rims and the rims carried by the hub, and spokes connecting said inner rims and the outer rim with the floating plate.

5. A wheel comprising two members, one member provided with a hollow sectional hub, and the other with a tire-rim, a cushioning device between the two members, a floating plate and guide-plates therefor located between the hub-sections, and each provided with a cut-out portion to receive a lubricant, and spokes connecting the floating plate with the tire-rim, substantially as described.

6. In a wheel, the combination of two members, one member provided with a hub, two removable collars supported by the hub, and each collar having spokes and a rim, and the other member provided with a tire-rim; a cushioning device arranged between said members, and means for permitting relative movement of the members, in the plane of rotation of the wheel, but for locking the said members against rotation relatively to each other.

7. The combination, in a wheel, of a sectional hub, rims carried by said hub, a floating plate located between the hub-sections, said floating plate having its main portion of a diameter not less than the diameter of the main portion of the said hub-sections, means for permitting only a relative movement between the hub-sections and said plate in the plane of rotation of the wheel, an outer rim connected to said plate by spokes, inner rims carried by said outer rim, and cushioning devices between said inner rims and the rims carried by the hub.

8. The combination in a wheel, of a hub member, a tire member, a cushioning device between the two, and means for permitting a relative movement between the two members only in the plane of rotation of the wheel, said means comprising a floating plate having radial projections, each of which is provided with a removable part, and spokes having heads which pass through openings in the said projections.

9. The combination in a wheel, of a hub member, a tire member, a cushioning device between the two, and means for permitting a relative movement between the two members only in the plane of rotation of the wheel, said means comprising a floating plate having radial projections, each of which is provided with a removable part, and spokes having heads which pass through openings in the said projections, which spokes are arranged in pairs and the heads of which abut.

10. The combination in a wheel of a hub member, a tire member comprising a tire-rim, two independent inner rims connected with said tire-rim and with each other and spokes which extend from the said tire-rim and between two said independent inner rims, a cushioning device between the hub member and the inner rims of the tire member, and means for only permitting relative movement of the members in the plane of rotation of the wheel.

GEORGE S. LEE.

Witnesses:
C. F. CARRINGTON,
D. HOWARD HAYWOOD.